April 19, 1949. S. J. HUDSON 2,467,480
PORTABLE GRILL
Filed Dec. 4, 1946 2 Sheets-Sheet 1
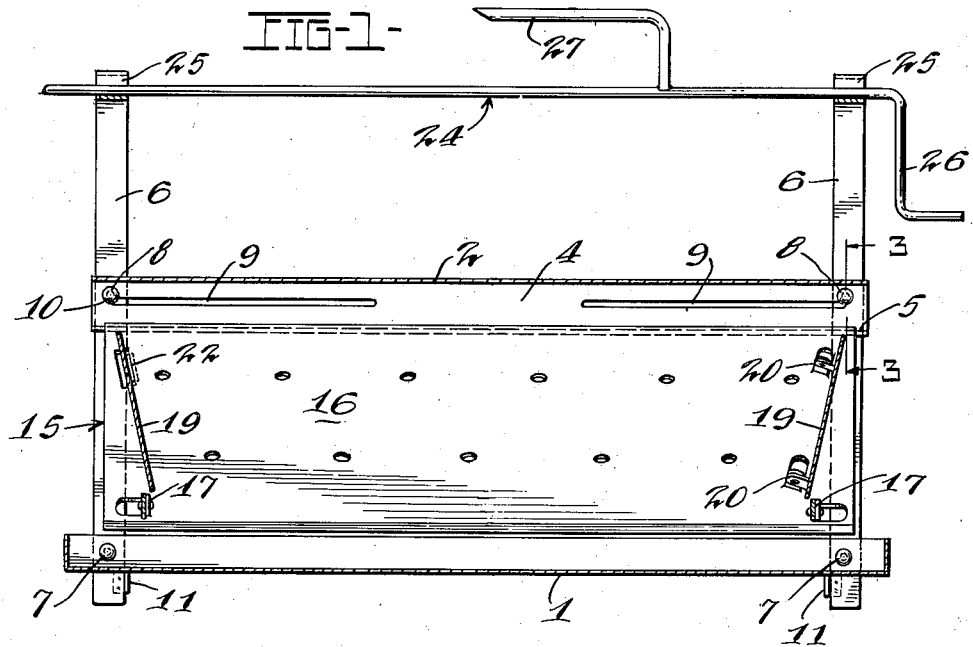
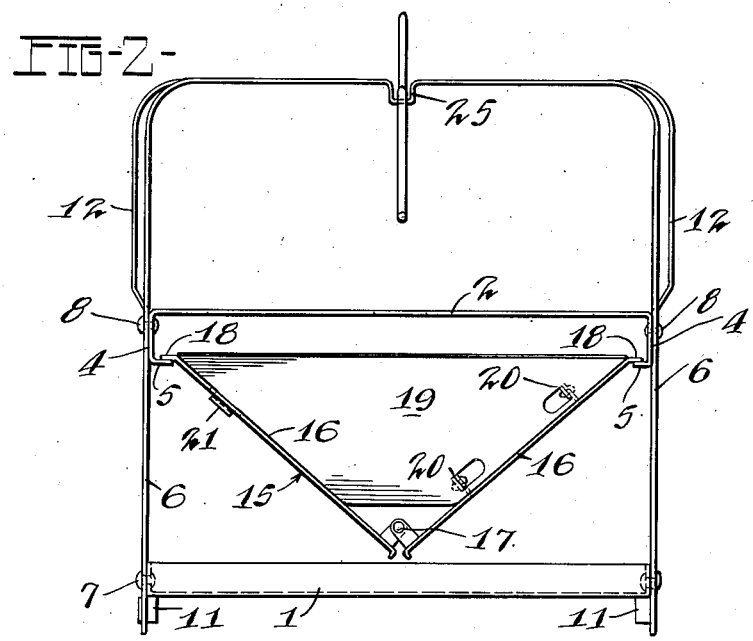 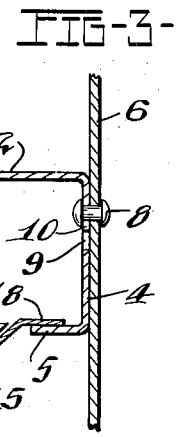
INVENTOR.
SHARON J. HUDSON
BY Owen & Owen,
ATTYS.

April 19, 1949.　　　S. J. HUDSON　　　2,467,480
PORTABLE GRILL
Filed Dec. 4, 1946　　　2 Sheets-Sheet 2
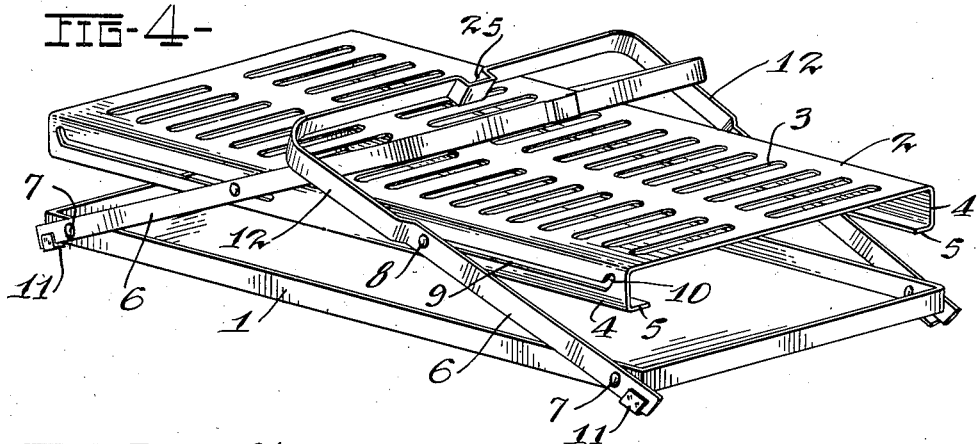
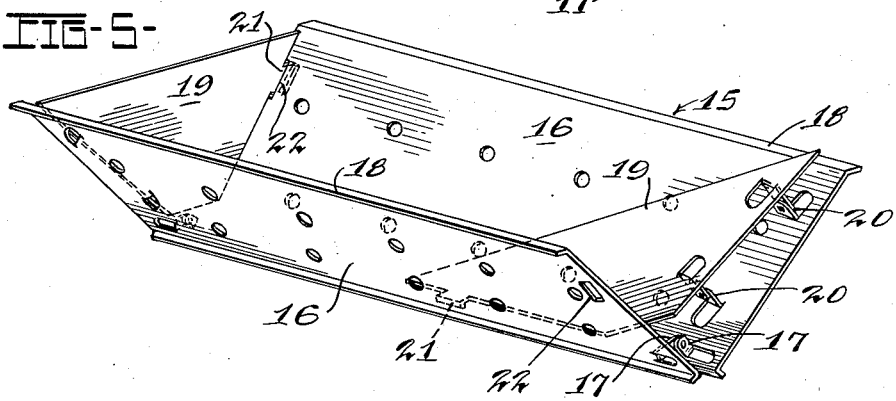
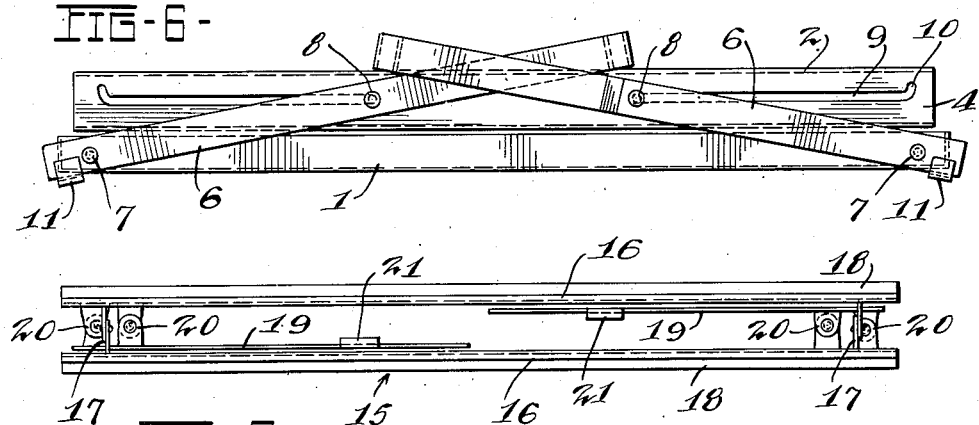
INVENTOR.
SHARON J. HUDSON
BY Owen & Owen,
ATTYS.

Patented Apr. 19, 1949

2,467,480

UNITED STATES PATENT OFFICE 2,467,480

PORTABLE GRILL

Sharon J. Hudson, Monroe County, Mich., assignor to Sharon Manufacturing Company, Toledo, Ohio, a partnership Application December 4, 1946, Serial No. 714,040

4 Claims. (Cl. 126—9)

1

This invention relates to grills of the portable type used by picnickers, or the like, and which are collapsible to adapt them to be folded in compact form for storing or transporting when not in use.

An object of the invention is the provision of a novel grill of this character that is simple, strong and durable in construction, light in weight and capable of being easily and quickly set up for use or folded in compact form.

Other objects and advantages of the invention will be apparent from the following detailed description thereof and from the accompanying drawings illustrating one embodiment thereof, in which Fig. 1 is a central longitudinal section of the grill in set-up position ready for use; Fig. 2 is an end view thereof; Fig. 3 is an enlarged sectional detail on the line 3—3 in Fig. 1; Fig. 4 is a perspective view of the grill in partially collapsed or folded form; Fig. 5 is a perspective view of the fire pot member in set-up form and separate from the remaining portions of the grill; Fig. 6 is a side view of the grill in completely folded or collapsed form, and Fig. 7 is a bottom edge view of the fire pot member in folded form.

Referring to the drawings, 1 designates an imperforate bottom pan or tray and 2 a grill plate having slots or openings 3 therein and having its side edges turned down to form vertical flanges 4 and then inwardly to form supporting ledges 5.

The plate 2 is collapsibly supported in spaced relation above the pan 1 by inverted U-shaped frame members 6, 6, which straddle both the pan and the plate, with their legs pivoted near their lower ends to the respective side walls of the pan as at 7, and with the intermediate portions of their legs in supporting pin and slot connection with the respective side flanges 4 of the grill plate. Each of these connections comprises, in the present instance, an inwardly projecting pin or stud 8 on the leg and a longitudinally extending slot 9 in the flange 4, with the slot terminating at its outer end adjacent to the respective end of the plate in an upturned portion 10 disposed in substantially a vertical line with the associated leg pivot 7.

Each frame 6 has the lower ends of its legs extended a short distance below the pan 1 to provide a support for the pan, and each of such extensions is provided at its inner edge with a stop lug 11 which engages the bottom edge of the pan when the respective frame is in upright position. It is thus apparent that each frame 6 is prevented from inward swinging movement from

2 vertical position when the pins 8 are in engagment with the respective locking recess or upturned portion 10 of the grill and also that it is prevented from outward swinging movement from such position by engagement of its stop lugs 11 with the bottom edge of the tray. In this manner the grill is firmly supported in set-up position above the pan and may be easily and quickly collapsed from such position to close folded relation to the pan 1 by disengaging the pins 8 and locking recesses 10 and permitting the pins to slide inward in the slots 9. When the grill is collapsed, the inner or closed end portion of one frame 6 is disposed over and receives the corresponding end portion of the other frame as shown in Figs. 4 and 6, and for this purpose the legs of one are spaced farther apart at their inner ends than the legs of the other frame, as indicated at 12. Otherwise, the legs of the frames are parallel with each other and disposed in common vertical planes at the respective sides of the grill.

When the grill is in set-up position, a fire pot 15 is suspended beneath the grill plate 2 and above the bottom pan 1. This first pot, in the present instance, is of V-form in cross-section, being composed of the two inclined sides 16, 16, which are perforated to permit air to pass upward therethrough and are hinged together in slightly spaced relation at their lower edges by pairs of pivotally connected lugs 17. The upper edges of the sides 16 are turned outwardly to form substantially horizontal flanges and these engage over the respective ledges 5 of the grill plate 2 to slidingly support the fire pot beneath said plate. The fire pot and plate may be placed in assembled relation by sliding engagement of one with the other.

The ends of the pot 15 are closed by end plates 19 of V-form and these are hingedly connected at one edge to one side 16 of the pot, as shown at 20, and are releasably connected at their other side edges to the opposite side of the pot by lugs 21 on the end plates engaging in registering openings 22 in the side. It is preferable to hinge the end plates 19 to opposite sides 16 of the pot to facilitate folding of the end plates within the pot. It is apparent by reference particularly to Figs. 5 and 6 that upon a folding of the end plates 19 against the respective sides 16, the two sides may be placed in substantially parallel relation to facilitate placing of the pot in the bottom pan 1 before the grill plate has been folded down thereagainst. This provides for a compact arrangement of the parts when the grill is in collapsed or folded position.

For the purpose of supporting a spit 24 the upper closed or loop portions of the frames 6 are provided centrally with recesses 25 for receiving the shaft or rod member of the spit. In the present instance, the spit 24 comprises a rod or shaft of sufficient length to extend over and rest on the tops of the frames 6 and one end is provided with a crank 26 for hand turning. The shaft intermediate its ends is provided with a laterally projecting pin member 27 with which a fowl or other object to be grilled may be engaged.

In the use of the grill, it may be easily and quickly set up from knock-down or collapsed position by raising the frame members 6 to upright position which effects a raising of the grill plate 2. When in this position the interengaging of the pins 8 with the recesses 10 in the flanges 4 of the plate hold the frames against inward swinging relative to the grill while the stop lugs 11 at the lower ends of the frame legs engage the lower edge of the bottom pan 1 to prevent outward swinging of the frames from their upright positions. This renders the grill firm and rigid in its set-up position. The fire pot 15 is thus opened up with its end plates 9 in end closing positions and the pot is slid under the grill plate with its top edge flanges 18 in engagement with the top sides of the inturned ledges 5 of the grill plate. The fire pot may be moved partially out from the grill plate to supply fuel to the pot and to render it accessible for lighting.

I wish it understood that my invention is not limited to any specific construction, arrangement or form of the parts, as it is capable of numerous modifications and changes without departing from the scope of the claims.

Having thus described my invention, what I claim as new and desire to secure by United States Letters Patent is:

1. In a grill of the class described, a bottom pan, inverted U-shaped frames the lower end portions of the legs of which are pivotally connected to said pan for swinging movements lengthwise thereof and to be placed in upright position relative to the pan, a grill plate above the pan and connections between said frame legs and plate for moving the plate downward toward the pan in a plane normal thereto when the frames are swung inwardly from upright position and to support the plate in elevated position relative to the pan when the frames are in upright position, said connections including means for releasably preventing said inward swinging movements of the frames, and means for preventing outward swinging movements of the frames from upright positions.

2. In a grill of the class described, a bottom pan, inverted U-shaped frames pivoted at the outer end portions of their legs to the sides of the pan for inward swinging movements from reclining to upright positions relative to the frame, a grill plate above said pan and between the legs of the frames, and connections between said frame legs and plate permitting inward swinging movements of the frames to lower the plate relative to the pan or outward swinging movements of the frames to raise the plate a predetermined extent relative to the pan when the frames are moved to upright position, said connections releasably preventing inward swinging movements of the frames from upright position, and means on the frame cooperating with said pan to prevent outward swinging movements of the frames from upright positions.

3. In a grill of the class described, a bottom pan, a fire pot and a grill plate disposed in superimposed relation in said order and frames for supporting said parts in said relation and having pivotal connection with the bottom pan, and pin and slot connection with said grill plate and operable to hold the parts in set-up relation and to swing into reclining position to move the grill plate in close relationship to said pan.

4. In a grill of the class described, a pair of inverted U-shaped transversely spaced frame members, a bottom pan straddled by said frame members and pivoted to the lower end portions of their legs, a grill plate straddled by the legs of said frames above the bottom pan, and having downwardly extending side flanges with inwardly turned ledges at their lower edges, connections between the legs of said members and said flanges for supporting said plate in elevated position above the bottom pan when the frame members are in upright position and for permitting inward collapsing movements of said plate relative to the pan when the frame members are swung inwardly from upright position, and a collapsible fire pot having outwardly turned side portions for sliding supporting engagement over said ledges when the grill plate is in raised position, said fire pot being slidingly removable from supporting engagement with said ledges.

SHARON J. HUDSON.

REFERENCES CITED

The following references are of record in the file of this patent:

UNITED STATES PATENTS

| Number | Name | Date |
| --- | --- | --- |
| 37,926 | Smith | Mar. 17, 1863 |
| 1,199,257 | Ferdon | Sept. 26, 1916 |
| 1,352,352 | Caswell | Sept. 7, 1920 |
| 1,540,434 | Stone | June 2, 1925 |
| 1,566,504 | Pearsall | Dec. 22, 1925 |
| 1,628,504 | Louis | May 10, 1927 |
| 1,846,607 | Nicholas | Feb. 23, 1932 |
| 1,839,218 | Reedy | Nov. 29, 1932 |
| 1,907,011 | Slagel | May 2, 1933 |
| 2,122,275 | Bitney | June 28, 1938 |
| 2,152,168 | Anderson et al. | Mar. 28, 1939 |
| 2,164,835 | Pearson et al. | July 4, 1939 |
| 2,307,914 | Bitney | Jan. 12, 1943 |